US012739666B2

(12) United States Patent
Karapantelakis et al.

(10) Patent No.: US 12,739,666 B2
(45) Date of Patent: Sep. 15, 2026

(54) USER PLANE AND CONTROL PLANE SEPARATION BASED ON MOBILITY AND THROUGHPUT PREDICTION

(71) Applicant: Telefonaktiebolaget LM Ericsson (publ), Stockholm (SE)

(72) Inventors: Athanasios Karapantelakis, Solna (SE); Maxim Teslenko, Sollentuna (SE); Divya Sachdeva, New Delhi (IN); Konstantinos Vandikas, Solna (SE); Kristijonas Cyras, San José, CA (US); Lackis Eleftheriadis, Valbo (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 281 days.

(21) Appl. No.: 18/578,110

(22) PCT Filed: Jul. 14, 2021

(86) PCT No.: PCT/EP2021/069621
§ 371 (c)(1),
(2) Date: Jan. 10, 2024

(87) PCT Pub. No.: WO2023/284954
PCT Pub. Date: Jan. 19, 2023

(65) Prior Publication Data
US 2024/0323712 A1 Sep. 26, 2024

(51) Int. Cl.
*H04W 24/02* (2009.01)
*H04W 52/02* (2009.01)

(52) U.S. Cl.
CPC ....... *H04W 24/02* (2013.01); *H04W 52/0206* (2013.01)

(58) Field of Classification Search
None
See application file for complete search history.

(56) References Cited

U.S. PATENT DOCUMENTS 10,602,380 B2 * 3/2020 Ryu ...................... H04W 24/02
2018/0242175 A1 * 8/2018 Miklós ................. H04W 24/04

FOREIGN PATENT DOCUMENTS

WO 2014021765 A2 2/2014

OTHER PUBLICATIONS

International Search Report and Written Opinion of the International Searching Authority, PCT/EP2021/069621, mailed May 11, 2022, 14 pages.

(Continued)

*Primary Examiner* — Hong S Cho
(74) *Attorney, Agent, or Firm* — Sage Patent Group

(57) ABSTRACT

For a set of access nodes of a wireless communication network, data throughput of user plane, UP, traffic and control plane, CP, traffic generated by wireless communication devices being served by the access nodes on a plurality of wireless carrier signals is predicted. Further, mobility of the wireless communication devices is predicted. Further, based on the predicted data throughput and the predicted mobility, it is decided for at least some of the plurality of wireless carrier signals whether the wireless carrier signal is assigned either to serving UP traffic, to serving CP traffic, or to serving both UP traffic and CP traffic.

20 Claims, 8 Drawing Sheets

(56) References Cited

OTHER PUBLICATIONS

Ericsson, "AI/ML for energy efficiency use case discussion," 3GPP TSG-RAN WG3 Meeting #112-e, R3-212315, May 17-27, 2021, Online Meeting, 10 pages.
Ericsson, "Overview of AI/ML use cases," 3GPP TSG-RAN WG3 Meeting #112-e, R3-212313, May 17-27, 2021, Online meeting, 6 pages.
3GPP TR 38.804 V1.0.0 (Mar. 2017); 3rd Generation Partnership Project; Technical Specification Group Radio Access Network; Study on New Radio Access Technology; Radio Interface Protocol Aspects (Release 14), 56 pages.
3GPP TS 23.214 V16.2.0 (Sep. 2020); 3rd Generation Partnership Project; Technical Specification Group Services and System Aspects; Architecture enhancements for control and user plane separation of EPC nodes; Stage 2 (Release 16), 98 pages.
Xu, Xiaodong et al., "Energy efficiency optimization-oriented control plane and user plane adaptation with a frameless network architecture for 5G," EURASIP Journal on Wireless Communications and Networking, 2015, 15 pages.
Liang, Kai et al., "Performance Analysis of Cellular Radio Access Networks Relying on Control- and User-Plane Separation," IEEE Transactions on Vehicular Technology, vol. 68, No. 7, Jul. 2019, 5 pages.

* cited by examiner

| **Model 1: Throughput Prediction** | |
|---|---|
| Input:<br>IMSI; CP U/L Throughput;<br>CP D/L Throughput; UP U/L Throughput;<br>UP D/L Throughput; timestamp | Output – likelihood for average traffic rating in next 24 hours<br>[CP D/L < 2Kbps]; [CP U/L < 2Kbps]; [UP D/L < 10 Mbps];<br>[UP U/L < 1Mbps] |
| 082902022557309891; 0.01; 0.0032; 20; 11; 2020-02-02 11:11 | |
| 082902022557309891; 0.0321; 0.00432; 18; 11; 2020-02-02 12:11 | 90%; 92%; 8%; 3% |
| 082902022557309891; 0.01; 0.0032; 19; 10; 2020-02-02 13:11 | |
| **Model 2: Mobility Prediction** | |
| Input:<br>IMSI; latitude; longitude; timestamp | Output – direction of mobility in the next 24 hours<br>[N, NE, E, SE, S, SW, W, NW, No Change] |
| 0829454473877716311; 38.8951; -77.0364; 2020-02-02 11:11 | |
| 0829454473877716311; 38.8951; -76.5254; 2020-02-02 11:12 | 90%; 2%; 2%; 2%; 1%; 0.5%; 0.5%; 2%; 0% |
| 0829454473877716311; 38.8951; -76.2522; 2020-02-02 11:13 | |

FIG. 5

USER PLANE AND CONTROL PLANE SEPARATION BASED ON MOBILITY AND THROUGHPUT PREDICTION

CROSS REFERENCE TO RELATED APPLICATIONS

This application is a 35 U.S.C. § 371 national stage application of PCT International Application No. PCT/EP2021/069621 filed on Jul. 14, 2021, the disclosure and content of which is incorporated by reference herein in its entirety.

TECHNICAL FIELD

The present invention relates to methods for controlling wireless communication and to corresponding devices, systems, and computer programs.

BACKGROUND

In wireless communication networks, e.g., as specified by 3GPP (3$^{rd}$ Generation Partnership Project), data traffic may be differentiated into user plane (UP) traffic and control plane (CP) traffic. The UP traffic includes user data generated by services or applications executed on a user device, typically referred to as UE ("user equipment"). The CP traffic includes control signaling, such as data for authentication, mobility management, billing, or the like.

3GPP TS 23.214 V16.2.0 (2020-09) specifies an architecture enhancement denoted as CP-UP separation (CUPS), which aims at enabling network operators to flexibly deploy and operate their networks to serve the needs of specific applications and reduce cost. For example, for low-latency applications, e.g., such as ultra-reliable low latency communication (uRLLC) applications, UP nodes or UP network functions can be placed closer to the radio edge, while CP nodes or CP network functions can be placed in a more centralized way. In addition to positioning, CUPS allows for independent scaling of the nodes, for example for use cases that require more UP traffic than CP traffic, such as some enhanced mobile broadband (eMBB) applications, it is possible to scale UP functions independently of CP functions. On the other hand, for applications that require more CP traffic than UP traffic, such as in the case of machine-to-machine (M2M) applications, it is possible to scale CP functions while leaving UP functions intact.

In the LTE (Long Term Evolution) technology specified by 3GPP, dual connectivity of a UE enables the UE to connect to two different access nodes, in the LTE technology denoted as eNB ("enhanced Node B"). This may in turn allow the UE to enhance its data throughput by using carrier aggregation with respect to the multiple eNBs. Further, multi-connectivity may allow a UE to simultaneously connect to multiple access nodes of different radio access technologies (RATs). This may for example allow for achieving redundancy or load splitting. Further, dual-connectivity or multi-connectivity also supports that CP traffic of a UE is transmitted with respect to one access node while UP traffic is transmitted with respect to another access node.

In "Energy efficiency optimization-oriented control plane and user plane adaptation with a frameless network architecture for 5G" by Xu, X., Dai, X., Liu, Y. et al., Journal on Wireless Communication Networking 2015, 159 (2015), https://doi.org/10.1186/s13638-015-0403-5, an end-to-end CUPS algorithm is proposed which reduces transmission power for RBSs (Radio Base Stations). In "Performance Analysis of Cellular Radio Access Networks Relying on Control- and User-Plane Separation" by K. Liang, G. Liu, L. Zhao, X. Chu, S. Wang and L. Hanzo, IEEE Transactions on Vehicular Technology, vol. 68, no. 7, pp. 7241-7245 July 2019, a CUPS algorithm is proposed that aims at providing reliable coverage for CP traffic and highest energy efficiency for UP traffic. This algorithm is based on the assumption that CP traffic is comparatively low throughput as compared to UP traffic.

However, these known CUPS algorithm may still have deficiencies in optimizing energy efficiency for both CP traffic and UP traffic. Accordingly, there is a need for techniques which allow for improving energy efficiency in CUPS scenarios.

SUMMARY

According to an embodiment, a method of controlling wireless communication is provided. The method comprises, for a set of access nodes of a wireless communication network, predicting data throughput of UP traffic and CP traffic generated by wireless communication devices being served by the access nodes on a plurality of wireless carrier signals. Further, the method comprises predicting mobility of the wireless communication devices. Further, the method comprises, based on the predicted data throughput and the predicted mobility, deciding for at least some of the plurality of wireless carrier signals whether the wireless carrier signal is assigned either to serving UP traffic, to serving CP traffic, or to serving both UP traffic and CP traffic.

According to a further embodiment, a node for a wireless communication network is provided. The node is configured to, for a set of access nodes of a wireless communication network, predict data throughput of UP traffic and CP traffic generated by wireless communication devices being served by the access nodes on a plurality of wireless carrier signals. Further, the node is configured to predict mobility of the wireless communication devices. Further, the node is configured to, based on the predicted data throughput and the predicted mobility, decide for at least some of the plurality of wireless carrier signals whether the wireless carrier signal is assigned either to serving UP traffic, to serving CP traffic, or to serving both UP traffic and CP traffic.

According to a further embodiment, a node for a wireless communication network is provided. The node comprises at least one processor and a memory. The memory contains instructions executable by said at least one processor, whereby the node is operative to, for a set of access nodes of a wireless communication network, predict data throughput of UP traffic and CP traffic generated by wireless communication devices being served by the access nodes on a plurality of wireless carrier signals. Further, the memory contains instructions executable by said at least one processor, whereby the node is operative to predict mobility of the wireless communication devices. Further, the memory contains instructions executable by said at least one processor, whereby the node is operative to, based on the predicted data throughput and the predicted mobility, decide for at least some of the plurality of wireless carrier signals whether the wireless carrier signal is assigned either to serving UP traffic, to serving CP traffic, or to serving both UP traffic and CP traffic.

According to a further embodiment of the invention, a computer program or computer program product is provided, e.g., in the form of a non-transitory storage medium, which comprises program code to be executed by at least one processor of one or more nodes of a wireless communication network. Execution of the program code causes the one or more nodes to, for a set of access nodes of a wireless communication network, predict data throughput of UP traffic and CP traffic generated by wireless communication devices being served by the access nodes on a plurality of wireless carrier signals. Further, execution of the program code causes the one or more nodes to predict mobility of the wireless communication devices. Further, execution of the program code causes the one or more nodes to, based on the predicted data throughput and the predicted mobility, decide for at least some of the plurality of wireless carrier signals whether the wireless carrier signal is assigned either to serving UP traffic, to serving CP traffic, or to serving both UP traffic and CP traffic.

Details of such embodiments and further embodiments will be apparent from the following detailed description of embodiments.

BRIEF DESCRIPTION OF THE DRAWINGS

FIG. 5 shows a table with exemplary data of prediction models used in the CUPS optimization algorithm.

DETAILED DESCRIPTION

In the following, concepts in accordance with exemplary embodiments of the invention will be explained in more detail and with reference to the accompanying drawings. The illustrated embodiments relate to management of DL transmit powers in a wireless communication network. The wireless communication network may be based on various technologies, e.g., the NR (New Radio) technology specified, the LTE technology specified by 3GPP, the UMTS (Universal Mobile Telecommunications System) technology specified by 3GPP, the General Packet Radio System (GPRS) technology specified by 3GPP, or on a combination of two or more of these technologies.

The illustrated concepts aim at optimization of energy efficiency of CUPS in a set of access nodes operating on a set of wireless carrier signals, in the following also denoted as carriers. The access nodes are herein also denoted Here, it is noted that different access nodes may utilize different carriers, and that one or more of carriers may be assigned to each access node. Further, each carrier may be assigned to a certain traffic direction, e.g., to a downlink (DL) direction from the wireless communication network to the UE or to an uplink (UL) traffic direction from the UE to the wireless communication network. Some of the carriers may also be assigned to both the UL traffic direction and the DL traffic direction. In the following such carriers are also denoted as UL carriers, DL carriers, and UL/DL carriers, respectively. The access nodes may support different RATs, e.g., the NR RAT, the LTE RAT, the UMTS RAT, and/or the GPRS RAT.

For the optimization of energy efficiency of CUPS, a CUPS optimization algorithm predicts data throughput of UP traffic and CP traffic generated wireless communication devices, in the following denoted as UEs, which are served by the set of access nodes. Further, the CUPS optimization algorithm predicts mobility of the UEs, e.g., attachment, detachment, or handovers, with respect to the access nodes of the set. Based on the predicted data throughput and the predicted mobility, the CUPS optimization algorithm decides for at least some of the carriers whether the carrier is assigned to UP traffic, to CP traffic, or to both UP traffic and CP traffic. Such assignment is in the following also denoted as "role assignment". The role assignment decisions may be performed with the aim of minimizing overall energy consumption of the access nodes, however while maintaining coverage of the access nodes, i.e., without losing coverage in a nominal coverage area of the access nodes. The CUPS optimization algorithm may be regarded as having two stages: a prediction stage which provides predictions of data throughput and mobility, and an assignment optimization stage, which optimizes the role assignments of the carriers and may also decide whether certain ports associated with the carriers can be turned off or need to be activated.

Figure 1:
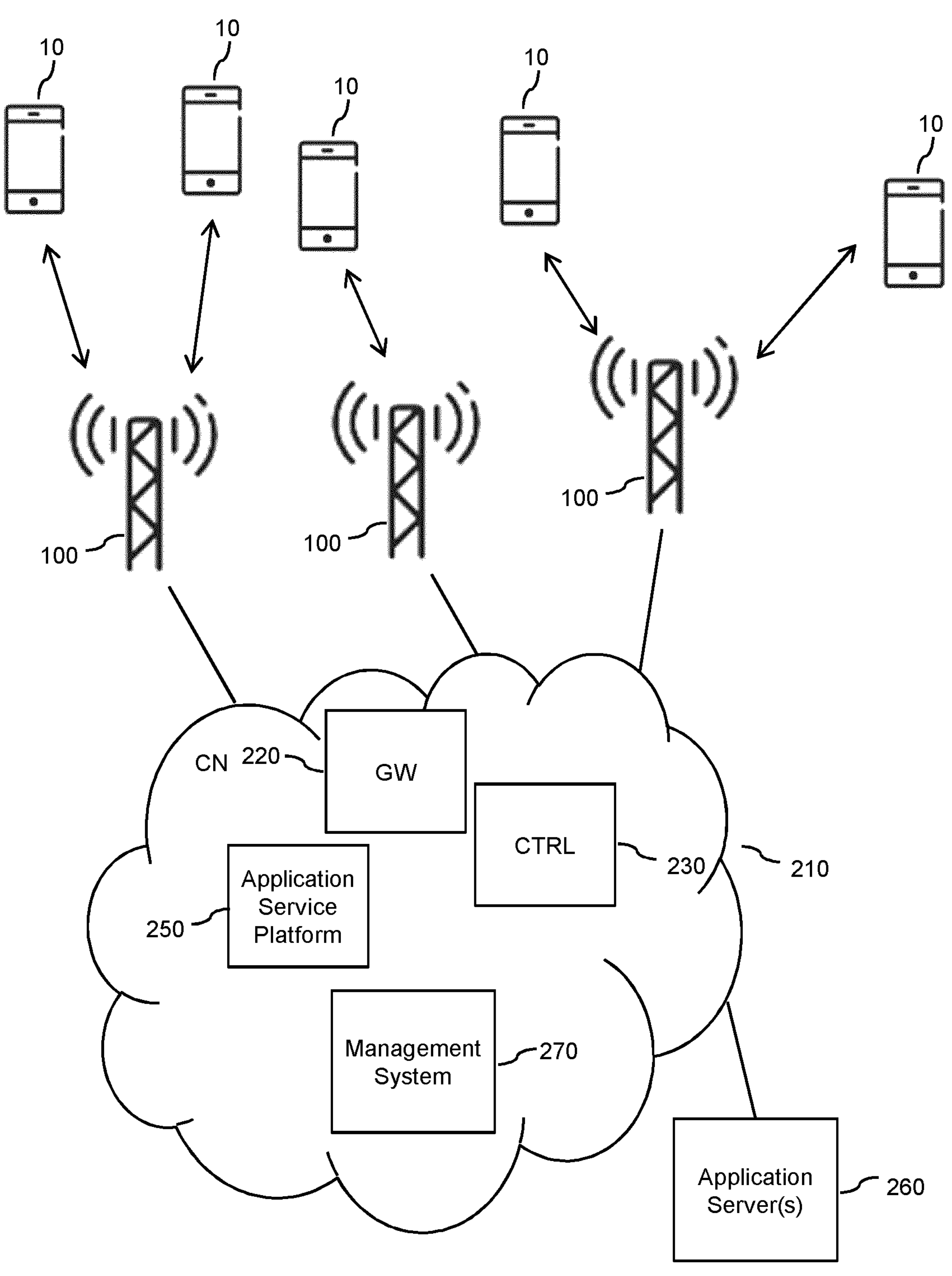
FIG. 1 schematically illustrates elements of an exemplary wireless communication network according to an embodiment.

FIG. 1 illustrates exemplary structures of the wireless communication network. In particular, FIG. 1 shows multiple UEs 10 which are served by access nodes 100 of the wireless communication network. Here, it is noted that each access node 100 may serve a number of cells within the coverage area of the wireless communication network. The depending on the supported RAT(s) each access nodes 100 may correspond to a gNB ("next generation Node B") of the NR technology, an eNB of the LTE technology, an NB ("Node B") of the UMTS technology, and/or a RBS ("Radio Base Station") of the GPRS technology. The access nodes 100 may each be regarded as being part of an RAN (Radio Access Network) of the wireless communication network. Further, FIG. 1 schematically illustrates a CN (Core Network) 210 of the wireless communication network. In FIG. 1, the CN 210 is illustrated as including a GW (gateway) 220, and a controller (CTRL) 230. The GW 220 may be responsible for handling UP traffic of the UEs 10, e.g., by forwarding user data traffic from a UE 10 to a network destination or by forwarding user data traffic from a network source to a UE 10. Here, the network destination may correspond to another UE 10, to an internal node of the wireless communication network, or to an external node which is connected to the wireless communication network. Similarly, the network source may correspond to another UE 10, to an internal node of the wireless communication network, or to an external node which is connected to the wireless communication network. The controller 230 may in turn be responsible for controlling the user data traffic, e.g., with respect to connection establishment, authentication, and/or mobility. The controller 230 may thus be responsible for handling CP traffic of the UEs. The controller 230 could for example correspond to an AMF (Access and Mobility Management Function) of the NR technology, an MME (Mobility Management Entity) of the LTE technology.

As illustrated by double-headed arrows, the access nodes 100 may send DL transmissions to the UEs, and the UEs may send UL transmissions to the access nodes 100. The DL transmissions and UL transmissions may be used to provide various kinds of services to the UEs, e.g., a voice service, a multimedia service, or a data service. Such services may be hosted in the CN 210, e.g., by a corresponding network node. By way of example, FIG. 1 illustrates an application service platform 250 provided in the CN 210. Further, such services may be hosted externally, e.g., by an AF (application function) connected to the CN 210. By way of example, FIG. 1 illustrates one or more application servers platform 260 provided connected to the CN 210. The application server(s) 260 could for example connect through the Internet or some other wide area communication network to the CN 210. The application service platform 250 may be based on a server or a cloud computing system and be hosted by one or more host computers. Similarly, the application servers 260 may be based on a server or a cloud computing system and be hosted by one or more host computers. The application server(s) 260 may include or be associated with one or more AFs that enable interaction with the CN 120 to provide one or more services to the UEs 10, corresponding to one or more applications. These services or applications may generate the user data traffic conveyed by the DL transmissions and/or the UL transmissions between the access node(s) 100 and the respective UE 10. Accordingly, the application server 260 may include or correspond to the above-mentioned network destination and/or network source for the user data traffic. In the respective UE 10, such service may be based on an application (or shortly "app") which is executed on the UE 10. Such application may be pre-installed or installed by the user. Such application may generate at least a part of the UP traffic between the UE 10 and the access node 100. Further, FIG. 1 illustrates a management system 270 provided in the CN 210. The management system 270 may be responsible for various management functionalities, such as configuration of nodes of the CN 210 or of the RAN, in particular configuration of the access nodes 100.

Figure 2A:
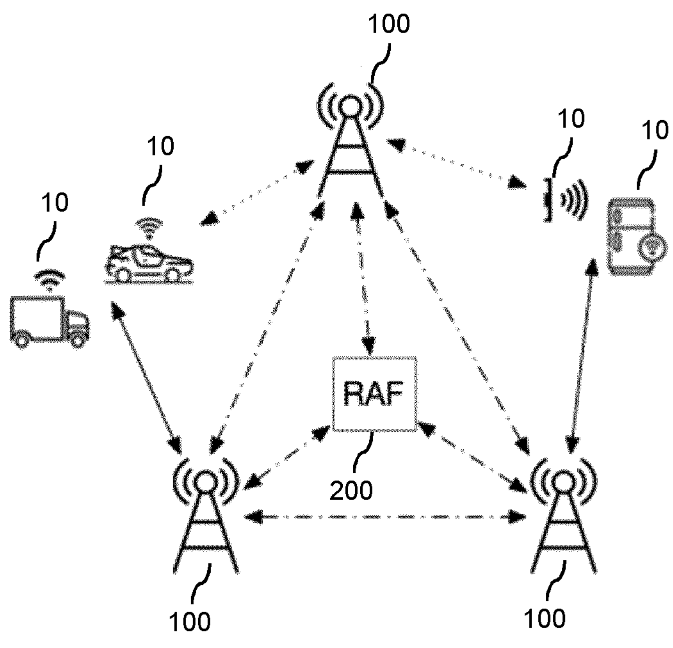
FIGS. 2A and 2B schematically illustrate functionalities for optimization of CUPS according to an embodiment.
Figure 2B:
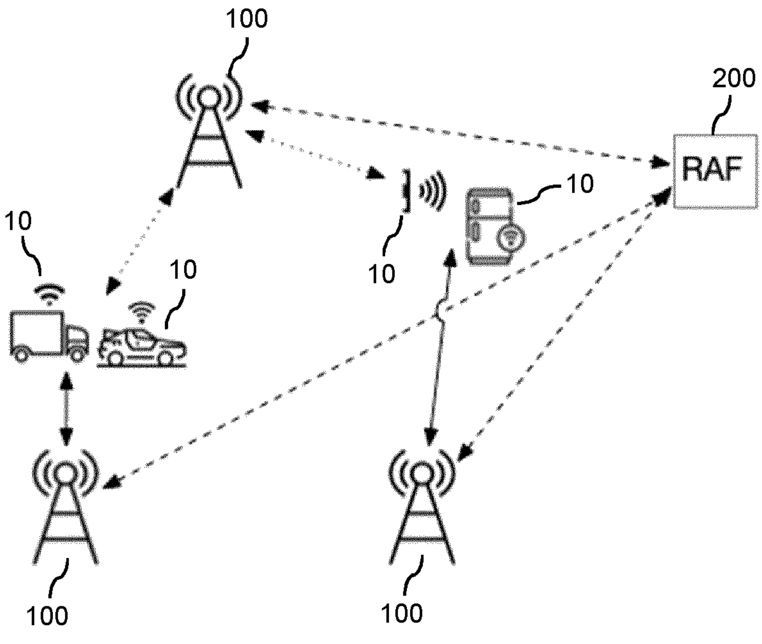

FIGS. 2A and 2B schematically illustrates functionalities of the CUPS optimization algorithm. In particular, FIGS. 2A and 2B illustrate a set of access nodes 100 to be optimized, UEs 10 served by these access nodes 100, and a logical component denoted as role assignment function (RAF) 200, which implements the CUPS optimization algorithm. The access nodes 100 could for example correspond to any of the access nodes 100 illustrated in FIG. 1. The RAF 200 is aware of the configuration of the access nodes 100 of the set. Further, the RAF 200 retrieves data traffic information from the access nodes 100 as well as an energy consumption profile of each access node 100. Using the reported data traffic information, the RAF 200 predicts future data traffic. Based on the predicted future data traffic, the RAF 200 then decides whether the respective role of one or more of the access nodes 100 should be reassigned, taking into account the energy profiles of the access nodes 200. FIG. 2A illustrates a variant where the RAF 200 is assumed to be part of the RAN. For example, the RAF 200 could be co-located with one of the access nodes 100, be implemented by one of the access nodes 100, or be implemented as a cloud system distributed over two or more of the access nodes 100. FIG. 2B illustrates a variant where the RAF 200 is provided outside the RAN, e.g., in the CN 210 or even in a third-party node outside the CN 210, e.g., in the management system 270 of FIG. 1.

Figure 3:
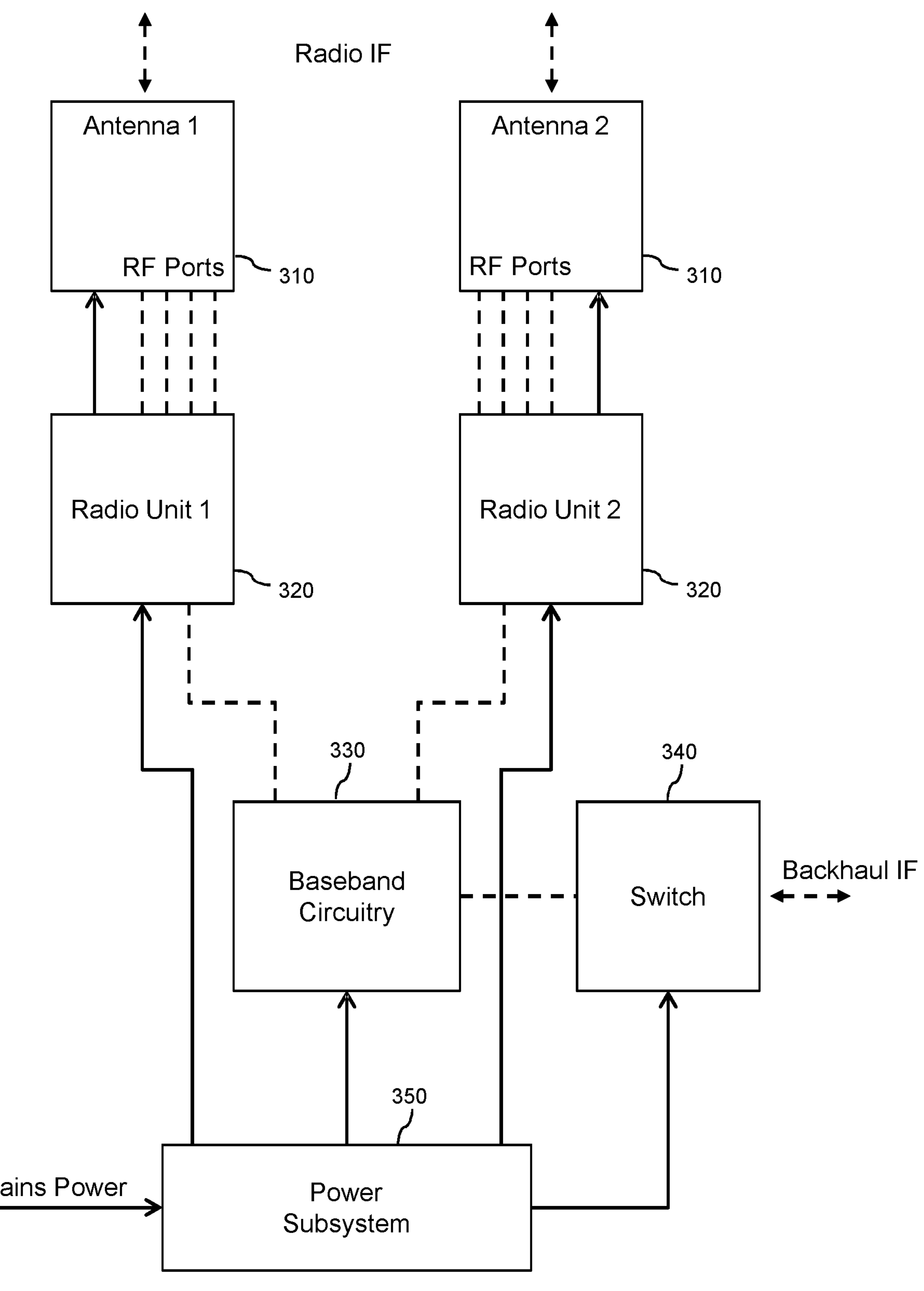
FIG. 3 schematically illustrates energy and signal flows in an access node according to an embodiment.

For the sake of better explaining the illustrated concepts, FIG. 3 schematically illustrates flows of data signals and power in an access node (AN). The AN may correspond to one of the above access nodes 100. Power flows are illustrated by solid arrows and data signal flows are illustrated by broken lines.

In the example of FIG. 3, the AN is assumed to be provided with multiple antennas 310, in particular a first antenna 310 denoted as Antenna 1 and a second antenna 310 denoted as Antenna 2. For each of the antennas 310, the AN includes a corresponding radio unit 320, in particular a radio unit 320 denoted as Radio Unit 1 and a second radio unit 320 denoted as Radio Unit 2. Further, the AN includes baseband circuitry 330, a switch 340, and a power subsystem 350. It is noted that these components do not necessarily constitute a unitary device. For example, the radio units 320 and the antennas 310 could be located remotely from the other components, e.g., on a radio tower. The antennas 310 and the radio units 320 provide a radio interface (Radio IF) of the AN, which is used for connecting to one or more UEs, such as the above UEs 10. The switch 340 provides a backhaul interface (Backhaul IF) of the AN, which is used for connecting the AN to other nodes of the wireless communication network, e.g., nodes of the CN 210 or other ANs.

The power subsystem 350 is assumed to be powered by mains power from the grid and/or from renewable sources. In some cases, powering of the power subsystem can also be assisted by batteries. The power subsystem 250 directly or indirectly powers the switch 340, baseband circuitry 330, the radio units 320, and the antennas 310, and optionally also other components which are not illustrated in FIG. 3, e.g., cooling equipment. In the DL traffic direction, the radio unit 320 converts a radio data signal received from the corresponding antenna 320 to an electrical data signal and provides it for further processing to the baseband circuitry 330. The baseband circuitry then sends the processed data signal in digital form to the switch 340, typically to be forwarded to the CN 210 and then to its final destination. In the UL traffic direction, the data follows the opposite path. For conveying the electrical data signals, each radio is connected via multiple RF (radio frequency) ports to its corresponding antenna 310. This connection is typically provided by coaxial cables.

As illustrated in FIG. 3, each radio unit 320 can have more than one pair of RF ports. Such multiple pairs of RF ports can be used to support more than one RAT in the AN, e.g., GPRS and LTE, or LTE and NR. Each radio unit 320 may also have a certain power efficiency rating, for example expressed in mW/Kbit. In addition to the power efficiency rating, the power efficiency of the radio unit 320 also depends on the current radio load. Accordingly, power efficiency of the radio unit 320 can be described as in terms of the power efficiency rating per radio load. The radio load can be described as percentage of a maximum load, e.g., in terms of active UEs as percentage of maximum UEs that can be supported, or in terms of a percentage of used bandwidth. In typical ANs, for example up to 40 W can be allocated per RF port of a radio unit with four RF ports, i.e., 4 times 40 W.

In the following, the illustrated concepts will be further explained by referring to a more detailed exemplary implementation of the CUPS optimization algorithm. As mentioned above, the RAF 200 may be provided with information concerning the configuration of the access nodes 100. This information may specifically include data about sectors served by the AN, such as the amount of sectors and the amount of radio units (RUs) in each sector. Since every RU typically also has a number of RF ports, each port serving a specific RAT on a number of carriers, the information provided to the RAF 200 may also indicate the number of RF ports of each RU and the served RAT. Still further, the information provided to the RAF may indicate the number of UEs attached on a certain carrier thus generating data traffic on the carrier. As mentioned above, each carrier may be configured to serve CP traffic, UP traffic, or both CP traffic and UP traffic.

The RU has the capacity to turn off unused RF ports independently, thereby allowing to save energy. The power efficiency rating of each RU typically relates to a number of factors such as the model of the RU, associated circuitry of the AN, or utilized type of power supply unit (PSU) or power distribution unit (PDU). Further, the power efficiency of the RU depends on the actual data throughput of the RU, i.e., the load pf the RU, environmental conditions, such as temperature and humidity, and the stability of the mains power, which may for example depend on the type of power source, such as a combination of batteries and own renewables, or power grid.

For a more mathematical description, the set of ANs to be optimized can be expressed as a population of neighboring ANs: $AN_{POP}=\{AN_1, \ldots, AN_k\}$. Then, for every $AN_x \in AN_{POP}$ there the following information may be reported to RAF 200:

- Some static information such as the ambient temperature ($AN_x$_temp) and humidity ($AN_x$_hum).
- A collection of RUs RUPOP_$AN_x$={RU1_$AN_x$, . . . , $RU_Y$_$AN_x$}, and for each $RU_k$_$AN_x$ in RUPOP_$AN_x$ a number of RF ports, each port having a state, such as active, idle, or shut, a number of carriers, and for every carrier an indication of its RAT, e.g., UMTS, LTE, or NR, the current data throughput on the carrier, differentiated as UL CP throughput, DL CP throughput, UL UP throughput, and DL UP throughput, a list of active UEs on the carrier, and the energy efficiency rating of $RU_k$_$AN_x$, e.g., in terms of watts/kbit. A corresponding information element have may the form: $RU_k$_$AN_x$={Power_Source, port1[state, carrier1{RAT, throughput[CP[UL][DL]][UP[UL][DL]], UE_list, Power_Efficiency}, . . . carrierL{RAT, throughput[CP[UL][DL][UP[UL][DL], UE_list, Power_Efficiency}], port2[ . . . ], . . . , portj[ . . . ]}.
- A list of active UEs on each carrier, corresponding to the above UE_list. Each UE in the list may be identified by a UE identifier ($UE_{ID}$), e.g., its IMSI (International Mobile Subscription Identifier). For each UE, the list includes the UE's recent mobility history. The recent mobility history can be expressed as a sequence of mobility events including handovers from one cell to another, attachment to a cell, or detachment from a cell. These cells may each be identified by a cell identifier (cellID). Information about the location of the cell corresponding to a certain cellID is typically stored in the mobility management nodes of the CN 210, i.e., in an MME of the LTE technology or an AMF of the NR technology. Accordingly, the mobility history contained in the list of active UEs can be a list of 4-tuples having the form: <cellID, latitude, longitude, timestamp>.

Figure 4:
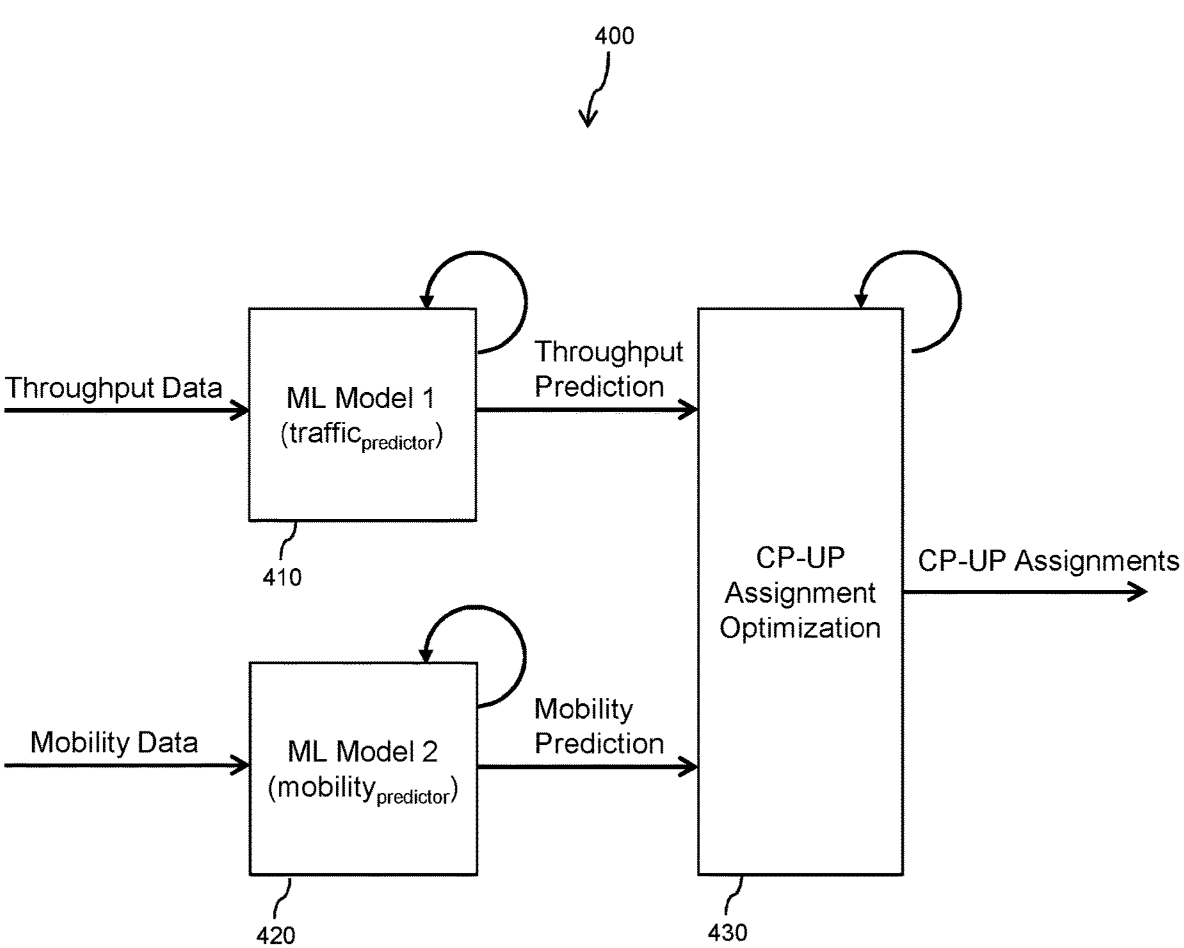
FIG. 4 shows a block diagram for schematically illustrating a CUPS optimization algorithm according to an embodiment.

FIG. 4 shows a block diagram for illustrating the CUPS optimization algorithm, in the illustration denoted by 400. As illustrated, the CUPS optimization algorithm 400 utilizes a first machine learning (ML) model 410 for the prediction of data throughputs, in the following also denoted as $traffic_{predictor}$ and a second ML model 420 for prediction of UE mobility, in the following also denoted as $mobility_{predictor}$. In the illustrated example, the first ML model 410 and the second ML model 420 are each assumed to be based on a neural network. However, it is noted that other types of ML model or artificial intelligence (AI) based mechanism could be used as well.

As illustrated, the first ML model 410 operates on the basis of throughput data representing data throughputs observed for each UE on the list of active UEs. The throughput data are differentiated into UL CP throughput, DL CP throughput, UL UP throughput, and DL UP throughput. The first ML model 410 is also trained on the basis of such throughput data, e.g., in a dedicated training phase and/or during regular operation of the CUPS optimization algorithm 400. For training, newly received throughput data may be used for verifying the predictions made by the first ML model 410 and to provide feedback for correcting neural network weights of the first ML model 410. Based on its input, the first ML model 410 provides a throughput prediction representing future throughputs of each UE on the list of active UEs, e.g., for the next 24 hours.

The second ML model 420 operates on the basis of mobility data representing mobility observed for the UEs on the list of active UEs. The second ML model 420 is also trained on the basis of such mobility data, e.g., in a dedicated training phase and/or during regular operation of the CUPS optimization algorithm 400. For training, newly received mobility data may be used for verifying the predictions made by the second ML model 420 and to provide feedback for correcting neural network weights of the second ML model 420. Based on its input, the second ML model 420 provides a mobility prediction representing future mobility of each UE on the list of active UEs, e.g., for the next 24 hours. Such mobility may be due to handovers, which typically result in the UE moving from one carrier to another carrier. Further, the mobility involve attachment of a UE and/or detachment of a UE. Each of such mobility events thus has an effect on the UEs which are active on a certain carrier.

As further illustrated, the CUPS optimization algorithm 400 includes a CP-UP assignment optimization stage 430 which receives the throughput predictions from the first ML model 410 and the mobility predictions from the second ML model 420. Based on these predictions, the CP-UP assignment optimization stage 430 adapts the role assignments of the carriers, i.e., assigns one or more of the carriers to UP traffic, assigns one or more of the carriers to CP traffic, or assigns one or more of the carriers to both UP traffic and CP traffic. Such assigned carriers are herein also denoted as CP carrier, UP carrier, and CP/UP carrier, respectively. The adaptation of the CP-UP assignment aims at reducing the overall energy consumption of the ANs. At its output, the CP-UP assignment optimization stage 430 thus provides CP-UP assignments indicating the assignment of each carrier. These CP-UP assignments may then be used for correspondingly reconfiguring the ANs. Alternatively or in addition, these CP-UP assignments may be used as input or a further iteration of the CP-UP assignment optimization stage 430. Based on the adapted role assignments, it can be decided to activate or deactivate RF ports of the ANs, to initiate handovers between carriers, within the same AN or different ANs, and/or to notify UEs about the reconfiguration of the carriers.

It is noted that also the CP-UP assignment optimization stage 430 could be based on an ML model. Such ML model could be trained using reinforcement learning (RL), based on actions corresponding to role assignments of the carriers and rewards based on changes in energy consumption reported by the considered ANs.

In an illustrative example, the operation of the CUPS optimization algorithm 400 may be described by the following pseudo-code:

Initialize $traffic_{predictor}$ neural network weights or alternatively use weights from the previous iteration
Initialize $mobility_{predictor}$ neural network weights or alternatively use weights from previous iteration
From time T=0 to T=K
  Collect mobility information for each UE from each AN in $AN_{POP}$ and create mobility profile of UE: [list ($UE_{ID}$, list [latitude, longitude, time]]
  Collect throughput information for UE from every RBS in RBSPOP and create traffic profile: [list ($UE_{ID}$, list [ul_throughput, downlink_throughput, time]]
  Train the $traffic_{predictor}$ and $mobility_{predictor}$ using collected mobility profile and traffic profile data
After time K elapses:
  Retrieve $AN_{POP}$ data, e.g., via X2 protocol from neighboring ANs or via OSS (Operations Support System)
Initialize predictionsLIST to empty
For every $AN_{current}$ in $AN_{POP}$
  For every $RU_{current}$ in $AN_{current}$
    For every $port_{current}$ in $RU_{current}$
      For every $carrier_{current}$ in $port_{current}$
        Initialize $throughput_{prediction}$ [CP[UL][DL], UP[UL][DL]]
        Initialize $mobility_{prediction}$ [[N,wN][NE,wNE][E,wE][SE,wSE][S,wS][SW,wSW][W,wW][NW,wNW]]
        Execute $traffic_{predictor}$ with $carrier_{current}$.throughput and update $throughput_{prediction}$
        For every UE in $carrier_{current}$, iterate UE_list and create a $mobility_{input}$ = [[N,$w_N$][NE,$w_{NE}$][E,$w_E$][SE,$w_{SE}$][S,$w_S$][SW,$w_{SW}$][W,$w_W$][NW,$w_{NW}$][No_change, $w_{No\_Change}$]]
        Execute $mobility_{predictor}$ with $mobility_{input}$, and update $mobility_{prediction}$
        Add <$AN_{current}$ $AN_{ID}$, $RU_{current}$ $RU_{ID}$, $carrier_{current}$ carrierID, $mobility_{prediction}$, $throughput_{prediction}$> to predictionsList
Iterate predictionsList and extract predicted throughput per RU and per AN, differentiated by CP, UP, UL, and DL, i.e. $throughput_{prediction}$ [CP[UL][DL], UP[UL][DL]] and identify expected demand using predicted mobility patterns $mobility_{prediction}$ Reassign RU carrier roles as CP carrier, UP carrier or CP/UP carrier for UL and DL traffic direction based on the predicted throughput demand taking into account the predicted mobility patterns, starting from the RUs with best power efficiency and most stable power source.

The CUPS optimization algorithm 400 may be iterated every time K, e.g., every day. The CUPS optimization algorithm 400 may be executed in in two phases: In a first phase, the mobility data and throughput data is collected from the ANs in the population. These data are buffered, and when the time K elapses, the data is used to train the first ML model 410 and the second ML model 420. The first ML model 410 and the second ML model 420 can be randomized in each iteration of the CUPS optimization algorithm 400. Alternatively, the first ML model 410 and the second ML model 420 can be trained incrementally using a transfer learning approach, i.e., learned results from previous iterations can be maintained. The choice between randomization and incremental learning may depend on dynamics of the data traffic and mobility. In very dynamic environments, e.g., cities, randomization and learning from scratch may be preferable in order not to carry over bias from previous training. In less dynamic environments, e.g., rural areas or for applications that have fixed UE traffic and mobility profiles such as certain M2M applications with sensors, incremental learning may be more preferable. In each case, the learning may be based on data reported and collected per UE:

For the first ML model 410 for the prediction of throughput, data elements of the collected data consist of the UE identifier, the data throughput generated by the UE in the UL traffic direction and the DL traffic direction, differentiated by CP traffic and UP traffic, and a timestamp indicating when the data throughput was observed. Such information may for example be available from counters in the ANs.

For the second ML model 420 for the mobility prediction, data elements of the collected data consist of the UE identifier, a cell identifier of the cell that the UE is attached to, such as a cell global identity, as well as a timestamp indicating the time when these data were observed. Such data may be available from mobility management nodes, such as an MME or AMF, or via OSS. Further, such data may be translated into geographical position information, in particular latitude and longitude. From changes of such data mobility events like handovers, attachment of the UE, or detachment of the UE may be derived. Further, changes of the geographical positions may be used to derive mobility indicators like movement toward north ([N]) and velocity of movement toward north ([$w_N$]), movement toward northeast ([NE]) and velocity of movement toward northeast ([$w_{NE}$]), movement toward east ([E]) and velocity of movement toward east ([$w_E$]), movement toward southeast ([SE]) and velocity of movement toward southeast ([$w_{SE}$]), movement toward south ([S]) and velocity of movement toward south ([$w_S$]), movement toward southwest ([SW]) and velocity of movement toward southwest ([$w_{SW}$]), and no change of position ([No_Change]) and velocity of no change of position ([$w_{No\_Change}$]). Here, it is noted that even when not changing the position, i.e., in the mobility state "no change of position", the UE may move with a certain velocity, however without moving to another cell.

The output of the first ML model 410 and the second ML model 420 is a predicted data throughput of UEs and a predicted mobility pattern of the UEs. The output can be based on statistic evaluation by regression or on classification. Here, usage of classification may in some cases allow for less complexity.

FIG. 5 illustrates a table with an example of input data and output data of the first ML model 410 and the second ML model 420. In the example of FIG. 5, it can be seen from the throughput data that for one of the data elements, the UE with UE identity 082902022557309891 is expected to generate fairly low throughput of CP traffic and rather high throughput of UP traffic. From the mobility data collected at the same time, it is evident that the UE with UE identity 082945447387771631 is likely to move in the northern direction.

The neural networks used in the first ML model 410 and the second ML model 420 should be sensitive to time series datasets. Accordingly, recurrent neural networks (RNNs) such as long-short term memory networks (LSTMs) may be used in the first ML model 410 and the second ML model 420. The training of the first ML model 410 and the second ML model 420 may be conducted by splitting the dataset received in the buffer in a random way to a set of training data and a set of test data used for verification and testing of the trained model's performance using an accuracy metric, e.g., area under curve (AUC). The training process may conclude if the metric indicates satisfactory accuracy of prediction. Accordingly, the first and second ML models 410, 420, which are responsible for predicting throughput and mobility, may be based on a different type of ML model than the CP-UP assignment optimization state 430. In particular, the first ML model 410 and the second ML model 420 may be based on RNNs, while the CP-UP optimization stage is based on RL.

The next phase of the CUPS optimization algorithm 400 is a deployment phase, in which CUPS optimization algorithm 400 decides on the role assignments of the carriers, using the predictions from the first ML model 410 and the second ML model 420 Here, it is noted that in the illustrated example the CP-UP role assignment is done wireless carrier for each RF port of each RU of each AN in the considered population of ANs. The process follows an approach wherein current observed values at time K, e.g., observations of last 10 minutes for K=1 day, for mobility and throughput are used to predict future mobility and throughput per UE. Then, the throughput and mobility predictions are aggregated for all UEs in a carrier. At the end of this aggregation step, the following information is produced per carrier:

- an estimate of future total bandwidth on a carrier for CP traffic and UP traffic in the UL traffic direction and the DL traffic direction, e.g., more than 10 Mbit for UP traffic in the DL traffic direction and less than 2 Mbit for UP traffic in the UL direction, and
- an estimate of future mobility of UEs on the carrier, e.g., indicating that 90% of the UEs are expected to move North, 5% of the UEs are expected to move south, and 5% are expected to move east.

Based on such predictions, the CUPS optimization algorithm 400 conducts a two-step CP-UP reassignment procedure per carrier. First, the CUPS optimization algorithm 400 identifies which ANs are more likely to have a high throughput demand by looking at the aggregate estimates of predicted mobility. For example if UEs in the middle of the coverage area of the AN population are moving north, then the ANs in the northern part of the coverage area can be identified being likely to have a high throughput demand. Then the CUPS optimization algorithm 400 may further analyze the expected throughput demand by predicting bandwidth will be needed for CP traffic in the DL traffic direction, CP traffic in the UL traffic direction, UP traffic in the DL traffic direction, and UP traffic in the UL traffic direction. Then the CUPS optimization algorithm 400 identifies which carriers are more energy efficient and reassigns the roles of the carriers if necessary. This reassignment process may start with reassignment of the of the most energy efficient carrier by assigning this carrier to handle the largest volume of CP traffic or UP traffic according to the predicted throughput demand. When performing the reassignment of the roles, the CUPS optimization algorithm 400 ensures that no part of the overall coverage areas of the considered population of ANs is left without coverage for CP traffic or UP traffic in any traffic direction. This can for example be achieved by reserving at least one carrier for that type of traffic which has a risk of losing coverage when considering merely the energy efficiency. After the reassignment, some RF ports of the ANs may be turned off if they are not needed for serving the throughput demand or maintaining the coverage.

On the side of the UEs, the CUPS optimization algorithm 400 may benefit from the UEs being able to connect to multiple RATs, e.g., using multiple radios. In this case, the reassignment of the carrier roles may consider that for a certain traffic type, e.g., UP traffic in the DL direction, a carrier of another RAT may provide a better energy efficiency. It is however noted that improvement of energy efficiency is also possible within the same RAT, e.g., due to different types of RUs which may have different energy efficiency rating for the same RAT.

In the following, some examples will explained in order to illustrate the energy benefits which can be obtained CUPS optimization algorithm 400. In these examples, a population of three ANs is assumed. Each AN is assumed to have three sectors, each covering 120 degrees, and RU per sector. Each RU has four RF ports, and a maximum of 40 W can be allocated to each RF port. Further, it is assumed that in each RU two RF ports, one transmit (TX) port and one reception (RX) port (RX/TX) are allocated to the GPRS RAT and that further two RF ports, one TX port and one RX port, are allocated to the LTE RAT. The cost for operating an idle RF port is assumed to be 10 W per RF port, to which the cost of data traffic is added up to the maximum of 40 W.

The GPRS carriers are assumed to be in the 900 MHz band, e.g., 890-915 MHz for TX carriers and 935-960 MHz for RX carriers. The LTE carriers are assumed to be in the band 24, i.e., 1626.5-1660.5 MHz for TX carriers and 1525-1559 MHz for RX carriers.

The LTE RAT typically has a range of up to 2 km, while the GPRS RAT has a range of 10 km. In the illustrated example, it is further assumed that the power efficiency of an LTE carrier is 10 mW/kbps, whereas the power efficiency of a GPRS is 2 mW/kbps. For reasons of simplicity it is also assumed that all carriers of the same RAT have the same power efficiency and that the power efficiency is independent of the load. For the GPRS RAT a capacity of 25 kbps per UE is assumed, corresponding to a baseline capacity of 2000 UEs per carrier. For the LTE RAT a capacity of 15 Mbps per UE is assumed, corresponding to a baseline capacity of 2000 UEs per carrier.

A first example assumes an M2M scenario, for example involving sensor UEs transmitting measured data, e.g., information about temperature. Further, an even distribution of UEs in all three sectors of the three ANs, is assumed. Each UE is assumed to have a traffic profile with CP traffic of 0.5 kbps in the UL traffic direction and 0.5 kbps in the DL traffic direction and UP traffic pf 5 kbps in the UL traffic direction and 4 kbps in the DL traffic direction. Further, it is assumed that the number of UEs per sector is 1000, corresponding to a total population of 9000 UEs in the three sectors of the three ANs.

When now assuming that before application of the CUPS optimization algorithm 400, the UEs send CP traffic and UP traffic through the LTE RAT, using one TX port and one RX port, the consumption per sector is: 10000 mW+10000 mW+[1000*(4 kbps+5 kbps+0.5 kbps+0.5 kbps)]*10 mW/kbps=120000 mW=120 W. When further the GPRS carriers also active, there is an additional of contribution 20

W per sector, giving a consumption of 140 W per sector. Accordingly, the total consumption of all three ANs would be 3*3*140 W=1.26 MW.

When now assuming that the CUPS optimization algorithm 400 assigns the GPRS carriers to the role of conveying the CP traffic while the LTE carriers are used only for the UP traffic, it becomes possible to used only one three-sector AN for maintaining coverage for the CP traffic, because the GPRS RAT has a wider range. Accordingly, the GPRS carriers of the other ANs can be turned off. The consumption for CP traffic thus amounts to 9000*(0.5 kbps+0.5 kbps)*2 mW/kpbs=18000 mW=18 W. The consumption for LTE UP traffic per sector is 1000*(4 kbps+5 kbps)*10 mW/kbps=90000 mW=90 W. The consumption for the total UP traffic for all sectors of all three ANs thus is 3*3*90 W=810 W. The total consumption for CP traffic and UP traffic thus is 810 W+18 W=828 W. As compared to the situation before optimization, there is thus a power saving of 432 W.

A second example assumes a mobile broadband scenario, with the same setup of three ANs, however with a different traffic profile of the UEs. In the second example, each UE is assumed to have CP traffic of 1 kbps in the UL traffic direction and 1 kbps in the DL traffic direction, and UP traffic of 100 kbps in the UL traffic direction and 400 kbps in the DL traffic direction. The number of UEs per sector is assumed to be 25, however in an uneven distribution with one of the sectors being unoccupied.

When all UEs operate on LTE carriers, the consumption can be calculated as follows: A total baseline consumption for operating all RF ports in all RUs of three sectors of three ANs is 3*3*40=360 W. The total population of UEs is 25*2*3=150. The additional cost for transmission and reception of CP traffic and UP traffic of the UEs is 150*(100 kbps+400 kbps+1 kbps+1 kbps)*10 mW/kbps=753000 mW=753 W. The total consumption is therefore 360 W+753 W=1113 W=1.113 MW.

When now assuming that the CUPS optimization algorithm 400 decides to turn of the RF ports of the unpopulated LTE sectors and to activate the GPRS carriers of one AN covering the entire UE population for CP traffic, the consumption is as follows: A total baseline consumption for operating the active RF ports is 3*2*40 W+40 W*3=360 W. The additional cost for transmission and reception of CP traffic and UP traffic of the UEs is 150*[(100 kbps+400 kbps)*10 mW/kbps]+150*[(1 kbps+1 kbps)*2 mW/kbps]=750000 mW+600 mW=750600 W=750.6 W. The total consumption is therefore 360 W+750.6 W=110.6 W=1.106 MW. As compared to the situation before optimization, there is thus a power saving of 2.4 W. An alternative optimization result could be that the GPRS carriers are not activated, and only unused LTE carriers are inactivated. The consumption is then as follows: A total baseline consumption for operating the active RF ports is 3*2*40 W=240 W. The additional cost for transmission and reception of CP traffic and UP traffic of the UEs is 150*(100 kbps+400 kbps+1 kbps+1 kbps)*10 mW/kbps=753000 mW=753 W. The total consumption is therefore 240 W+753 W=993 W. As compared to the situation before optimization, there is thus a power saving of 120 W.

As illustrated by the above examples, by considering the predicted traffic profiles of UEs and the population of carriers resulting from the predicted mobility, the CUPS optimization algorithm 400 can achieve significant power saving.

Figure 6:
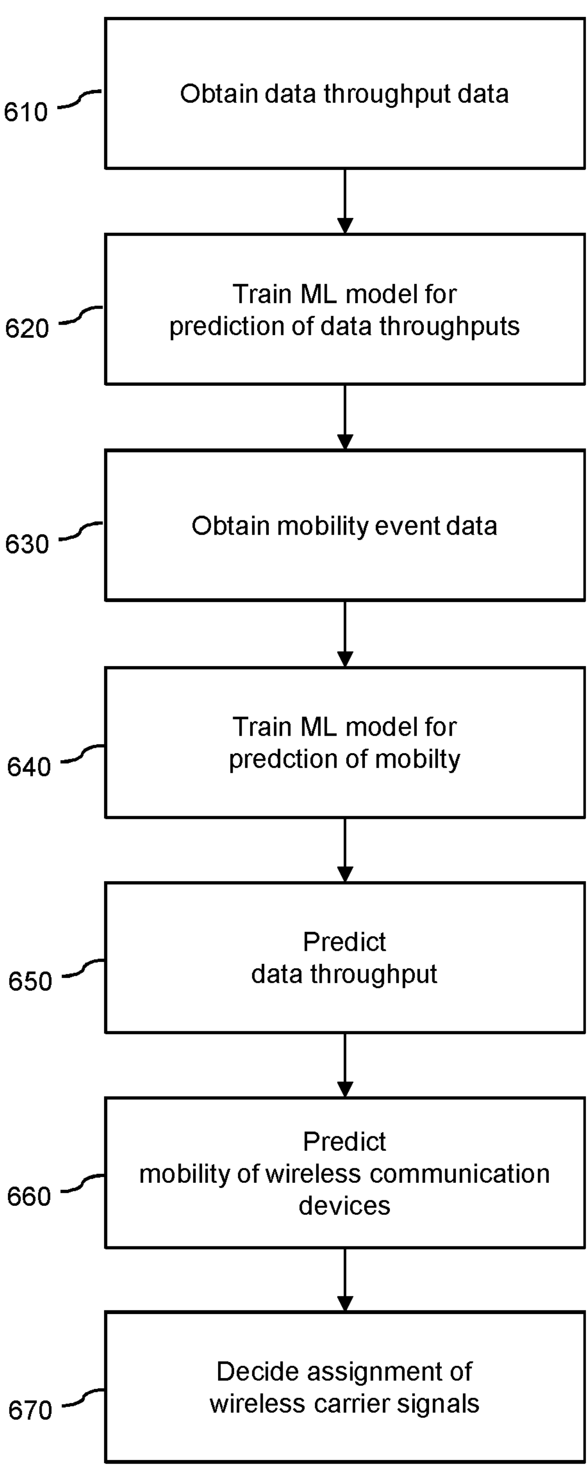
FIG. 6 shows a flowchart for illustrating a method according to an embodiment.

FIG. 6 shows a flowchart for illustrating a method of controlling transmissions in a wireless communication network. The method of FIG. 6 may be utilized for implementing the illustrated concepts in a node of the wireless communication network, e.g., in a node implementing the above-mentioned RAF 200. As mentioned above, such node could be implemented by one or more access nodes, such as the above-mentioned access nodes 100, or by a management node, such as the above-mentioned management node 270, or a control node, such as the above-mentioned control node 230.

Accordingly, at least some steps of the method of FIG. 6 may be performed by one or more nodes of a RAN of the wireless communication network. Alternatively or in addition, at least some steps of the method of FIG. 6 may be performed by one or more nodes of a CN of the wireless communication network. Further, it would also be possible that at least some of the steps of the method are performed by one or more nodes outside the RAN or CN of the wireless communication network, e.g., in one or more nodes hosted by a third-party cloud provider.

If a processor-based implementation of such node performing at least some steps of the method of FIG. 6 is used, at least some of the steps of the method of FIG. 6 may be performed and/or controlled by one or more processors of the node. Such node may also include a memory storing program code for implementing at least some of the below described functionalities or steps of the method of FIG. 6.

At step 610, throughput data representing data throughput of wireless communication devices may be obtained, such as the above-mentioned throughput data provided as input to the first ML model 410. The throughput data can be collected from access nodes of the wireless communication network, e.g., from the above-mentioned access nodes 100.

At step 620, a first ML model for prediction of data throughput of wireless communication devices may be trained, e.g., using at least a part of the throughput obtained at step 610. The above-mentioned first ML model 410 is an example of the first ML model trained at step 620. The first ML model may be based on a neural network, e.g., an RNN.

At step 630, mobility data representing mobility of wireless communication devices may be obtained, such as the above-mentioned mobility data provided as input to the second ML model 420. The mobility data can be collected from one or more mobility management nodes of the wireless communication network, e.g., from an MME or AMF.

At step 640, a second ML model for prediction of mobility of wireless communication devices may be trained, e.g., using at least a part of the throughput obtained at step 610. The above-mentioned second ML model 420 is an example of the second ML model trained at step 630. The second ML model may be based on a neural network, e.g., an RNN.

At step 650, data throughput is predicted. In particular, for a set of access nodes of the wireless communication network, data throughput is predicted for UP traffic and CP traffic generated by wireless communication devices which are served by the access nodes on a plurality of wireless carrier signals. The data throughputs may for example be predicted based on at least a part of the throughput data obtained at step 610. In particular, the data throughputs may be predicted by the first ML model trained at step 620, and this prediction by the first ML model may be accomplished based on at least a part of the throughput data obtained at step 610.

The prediction of the data throughput at step 650 may thus be based on a first ML model trained based on of first data representing data throughputs observed with respect to the set of access nodes.

At step 660, mobility of the wireless communication devices is predicted. The mobility may for example be predicted based on at least a part of the mobility data obtained at step 630. In particular, the mobility may be predicted by the second ML model trained at step 640, and this prediction by the second ML model may be accomplished based on at least a part of the mobility data obtained at step 630.

The prediction of the mobility at step 660 may thus be based on a second ML model trained based on second data representing mobility observed with respect to the set of access nodes. The mobility may be observed in connection with attachment of a wireless communication device to an access node of the set, detachment of a wireless communication device to an access node of the set, handover of a wireless communication device from an access node of the set, and/or handover of a wireless communication device to an access node of the set.

At step 670, based on the data throughput predicted at step 650 and the mobility predicted at step 660, it is decided for at least some of the plurality of wireless carrier signals whether the wireless carrier signal is assigned either to serving UP traffic, to serving CP traffic, or to serving both UP traffic and CP traffic. Accordingly, the roles of at least some of the wireless carrier signals may be reassigned among the roles of CP carrier, UP carrier, and CP/UP carrier. Further, based on the predicted data throughput and the predicted mobility, it can be decided for at least some of the plurality of wireless carrier signals whether to turn off transmission on the wireless carrier signal. Such turning off of transmission on the wireless carrier signal may involve turning off a port of the access node which transmits or receives the wireless carrier signal, e.g., like one or more of the above-mentioned RF ports 320. Such decision may also consider possible reassignments of the wireless carrier signals as CP carrier, UP carrier, or CP/UP carrier.

The decision of step 670 may be based on an assignment optimization algorithm aiming at minimization of energy consumption by the set of access nodes, such as the above-mentioned CP-UP assignment optimization stage. Various kinds of optimization algorithm could be used, e.g., an optimization algorithm based on an ML model. Such ML model could be trained using RL, based on actions corresponding to role assignments of the wireless carrier signals and rewards based on changes in energy consumption reported by the access nodes. Accordingly, the assignment optimization algorithm could be trained based on data representing energy consumption reported with respect to the set of access nodes.

The wireless carrier signals are allocated to different RATs. Such different RATs may for example include the NR RAT, the LTE RAT, the UMTS RAT, and/or the GPRS RAT. Further, the wireless carrier signals may be allocated to different transmission directions. For example, a first subset of one or more of the wireless carrier signals can each be allocated to a UL transmission direction. Further, wherein a second subset of one or more of the wireless carrier signals can each be allocated to a DL transmission direction. Further, a third subset of one or more of the wireless carrier signals can each be allocated to both the DL and UL transmission directions.

Figure 7:
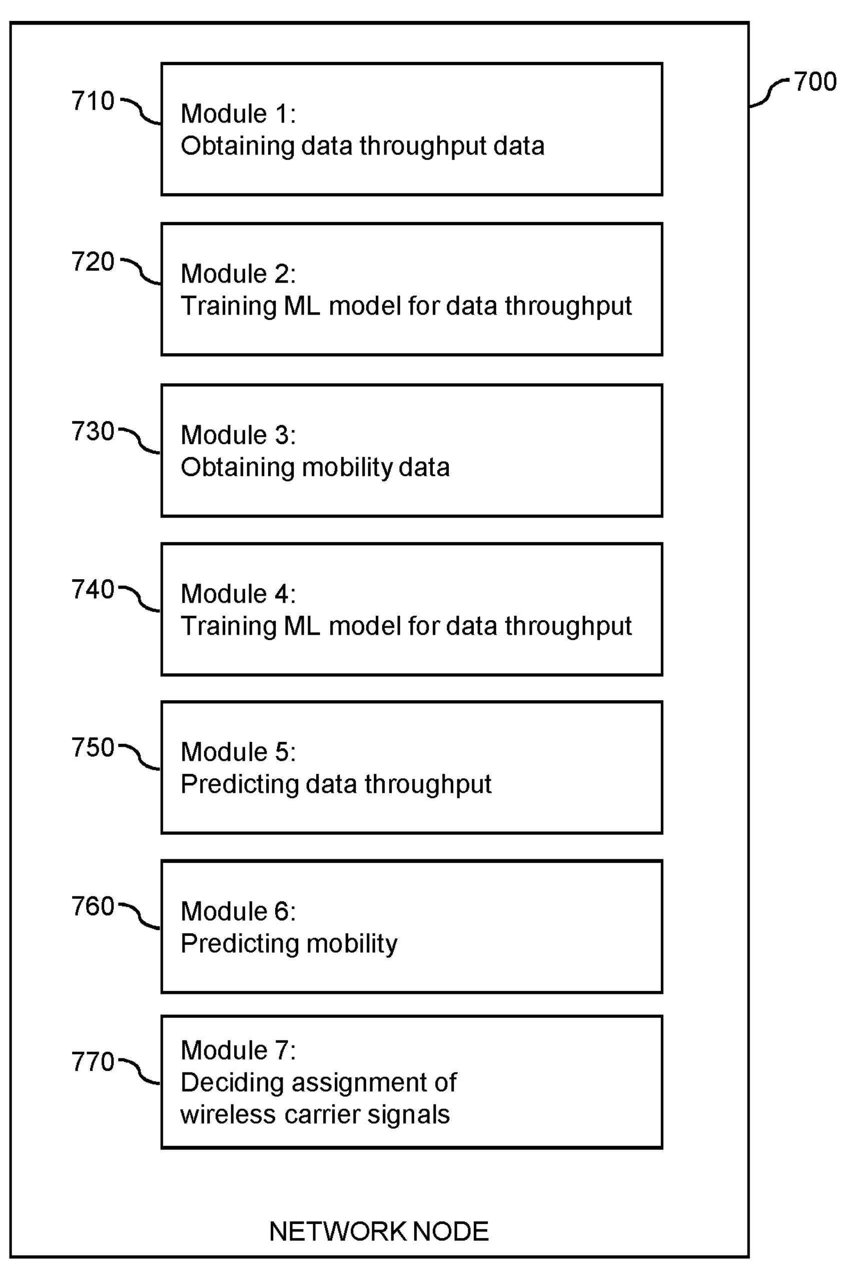
FIG. 7 shows an exemplary block diagram for illustrating functionalities of a node implementing functionalities corresponding to the method of FIG. 6.

FIG. 7 shows a block diagram for illustrating functionalities of a network node 700 which operates according to the method of FIG. 6. The network node 700 may for example implement a RAN node, such as the above-mentioned access nodes 100, or a CN node, such as the above-mentioned management system 270 or control node 230. The node 700 may correspond to the above-mentioned RAF 200. As illustrated, the network node 700 may be provided with a module 710 configured to obtain throughput data, such as explained in connection with step 610. Further, the network node 700 may be provided with a module 720 configured to train an ML model for predicting throughput, such as explained in connection with step 620. Further, the network node 700 may be provided with a module 730 configured to obtain mobility data, such as explained in connection with step 630. Further, the network node 700 may be provided with a module 740 configured to train an ML model for predicting mobility, such as explained in connection with step 640. Further, the network node 700 may be provided with a module 750 configured to predict throughput, such as explained in connection with step 650. Further, the network node 700 may be provided with a module 760 configured to predict mobility, such as explained in connection with step 660. Further, the network node 700 may be provided with a module 770 configured to decide on assignment of wireless carrier signals, such as explained in connection with step 670.

It is noted that the network node 700 may include further modules for implementing other functionalities, such as known functionalities of a management system. Further, it is noted that the modules of the network node 700 do not necessarily represent a hardware structure of the network node 700, but may also correspond to functional elements, e.g., implemented by hardware, software, or a combination thereof.

Figure 8:
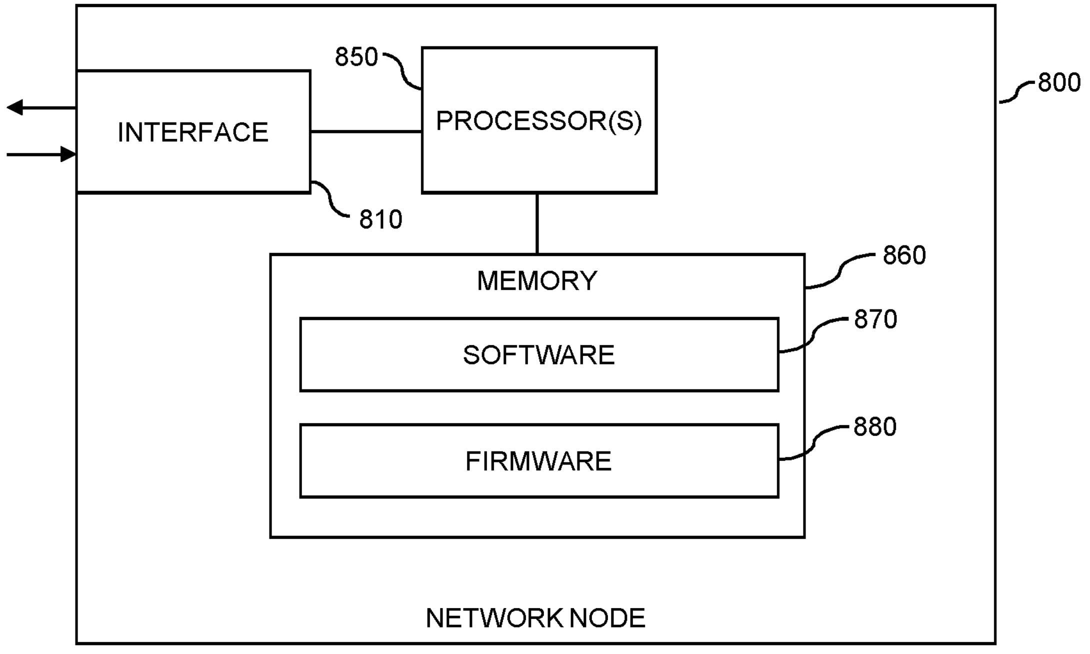
FIG. 8 schematically illustrates structures of a network node according to an embodiment.

FIG. 8 illustrates a processor-based implementation of a network node 800 which may be used for implementing the above-described concepts. The network node 800 may for example implement a RAN node, such as the above-mentioned access nodes 100, or a CN node, such as the above-mentioned management system 270 or control node 230. The node 800 may correspond to the above-mentioned RAF 200 or implement at least a part of the functionalities of the RAF 200. In some scenarios, also a system of multiple network nodes 800 with structures as illustrated in FIG. 8 may be used implementing the above-described concepts, e.g., in a cloud-architecture where such multiple network nodes cooperate.

As illustrated, the network node 800 includes one or more interfaces 810. These interfaces 810 may for example be used for enabling communication with one or more other network nodes.

Further, the network node 800 may include one or more processors 850 coupled to the interface(s) 810 and a memory 860 coupled to the processor(s) 850. By way of example, the interface(s) 810, the processor(s) 850, and the memory 860 could be coupled by one or more internal bus systems of the network node 800. The memory 860 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 860 may include software 870 and/or firmware 880. The memory 860 may include suitably configured program code to be executed by the processor(s) 850 so as to implement the above-described functionalities of a network node, such as explained in connection with FIG. 6.

It is to be understood that the structures as illustrated in FIG. 8 are merely schematic and that the network node 800 may actually include further components which, for the sake of clarity, have not been illustrated, e.g., further interfaces or processors. Also, it is to be understood that the memory 860 may include further program code for implementing known functionalities of a network node, e.g., known functionalities of a management system for a 3GPP network. According to some embodiments, also a computer program may be provided for implementing functionalities of the network node 800, e.g., in the form of a physical medium storing the program code and/or other data to be stored in the memory 860 or by making the program code available for download or by streaming.

As can be seen, the illustrated concepts may be used for improving power efficiency of CUPS. In particular, by considering predicted data throughput and predicted mobility, role assignments of carriers as CP carrier, UP carrier, or CP/UP carrier may be efficiently optimized to minimize overall energy consumption of the considered access nodes.

It is to be understood that the examples and embodiments as explained above are merely illustrative and susceptible to various modifications. For example, the illustrated concepts may be applied in connection with various wireless communication network technologies, without limitation to the above-mentioned examples. Further, the illustrated CUPS optimization algorithm may be used for access node populations of various sizes, e.g., access nodes of a tracking area or even all access nodes of a certain operator.

Moreover, it is to be understood that the above concepts may be implemented by using correspondingly designed software to be executed by one or more processors of an existing device or apparatus, or by using dedicated device hardware. Further, it should be noted that the illustrated nodes may each be implemented as a single device or as a system of multiple interacting devices or modules, e.g., as a cloud system.

The invention claimed is:

1. A method of controlling wireless communication, the method comprising:

for a set of access nodes of a wireless communication network, predicting data throughput of user plane traffic and control plane traffic generated by wireless communication devices being served by the access nodes on a plurality of wireless carrier signals;

predicting mobility of the wireless communication devices; and based on the predicted data throughput and the predicted mobility, deciding for at least some of the plurality of wireless carrier signals whether the wireless carrier signal is assigned either to serving user plane traffic, to serving control plane traffic, or to serving both user plane traffic and control plane traffic.

2. The method according to claim 1, further comprising:

based on the predicted data throughput and the predicted mobility, deciding for at least some of the plurality of wireless carrier signals whether to turn off transmission on the wireless carrier signal.

3. The method according to claim 2, wherein turning off transmission on the wireless carrier signal comprises turning off a port of the access node transmitting or receiving the wireless carrier signal.

4. The method according to claim 1, wherein said deciding is based on an assignment optimization algorithm aiming at minimization of energy consumption by the set of access nodes.

5. The method according to claim 4, wherein the assignment optimization algorithm aims at minimization of energy consumption by the set of access nodes while maintaining coverage for user plane traffic and control plane traffic by the set of access nodes.

6. The method according to claim 4, wherein the assignment optimization algorithm is based on a machine learning model trained by reinforcement learning.

7. The method according to claim 6, wherein the assignment optimization algorithm is trained based on data representing energy consumption observed with respect to the set of access nodes.

8. The method according to claim 1, wherein the wireless carrier signals are allocated to different radio access technologies.

9. The method according to claim 1, wherein a first subset of one or more of the wireless carrier signals are each allocated to an uplink transmission direction.

10. The method according to claim 1, wherein a second subset of one or more of the wireless carrier signals are each allocated to a downlink transmission direction.

11. The method according to claim 1, wherein a third subset of one or more of the wireless carrier signals are each allocated to both downlink and uplink transmission directions.

12. The method according to claim 1, wherein said predicting of the data throughput is based on a first machine learning model trained based on first data representing data throughputs observed with respect to the set of access nodes.

13. The method according to claim 12, further comprising:

training the first machine learning model based on the first data.

14. The method according to claim 1, wherein said predicting of the mobility is based on a second machine learning model trained based on second data representing mobility of wireless communication devices observed with respect to the set of access nodes.

15. The method according to claim 14, wherein the mobility is observed in connection with attachment of a wireless communication device to an access node of the set, detachment of a wireless communication device from an access node of the set, handover of a wireless communication device from an access node of the set, and/or handover of a wireless communication device to an access node of the set.

16. The method according to claim 14, further comprising:

training the second machine learning model based on the second data.

17. The method according to claim 1, wherein at least some steps of the method are performed by one or more nodes of a radio access network of the wireless communication network.

18. The method according to claim 1, wherein at least some steps of the method are performed by one or more nodes of a core network of the wireless communication network.

19. A node for a wireless communication network, the node comprising:

at least one processor;

a memory containing instructions when executed by the at least one processor are configured to perform operations including:

for a set of access nodes of a wireless communication network, predict data throughput of user plane traffic and control plane traffic generated by wireless communication devices being served by the access nodes on a plurality of wireless carrier signals;

predict mobility of the wireless communication devices; and based on the predicted data throughput and the predicted mobility, decide for at least some of the plurality of wireless carrier signals whether the wireless carrier signal is assigned either to serving user plane traffic, to serving control plane traffic, or to serving both user plane traffic and control plane traffic.

20. The node according to claim 19, wherein the operations performed by the at least one processor of the node further comprise:

based on the predicted data throughput and the predicted mobility, decide for at least some of the plurality of wireless carrier signals whether to turn off transmission on the wireless carrier signal.

* * * * *